(12) United States Patent
Granitz et al.

(10) Patent No.: US 7,426,834 B2
(45) Date of Patent: Sep. 23, 2008

(54) "GET HOME" OIL SUPPLY AND SCAVENGE SYSTEM

(75) Inventors: Charles Robert Granitz, Loveland, OH (US); Mark Eden Zentgraf, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1096 days.

(21) Appl. No.: 10/770,783

(22) Filed: Feb. 3, 2004

(65) Prior Publication Data

US 2005/0166570 A1 Aug. 4, 2005

(51) Int. Cl.
*F02C 7/06* (2006.01)
(52) U.S. Cl. .................. 60/772; 60/39.08; 184/6.11
(58) Field of Classification Search ............. 60/39.08, 60/772; 184/6.11
See application file for complete search history.

(56) References Cited

U.S. PATENT DOCUMENTS

| | | | |
|---|---|---|---|
| 2,888,097 A * | 5/1959 | Scheffler, Jr. ............ | 184/6.23 |
| 4,631,009 A * | 12/1986 | Cygnor et al. ........... | 60/39.08 |
| 4,891,934 A * | 1/1990 | Huelster .................. | 60/39.08 |
| 5,201,845 A | 4/1993 | Allmon et al. | |
| 5,257,903 A | 11/1993 | Allmon et al. | |
| 5,319,920 A | 6/1994 | Taylor | |
| 5,610,341 A | 3/1997 | Tortora | |
| 6,363,707 B2 * | 4/2002 | Junquera ................ | 60/39.08 |
| 6,439,767 B1 | 8/2002 | Badeer | |
| 6,470,666 B1 | 10/2002 | Przytulski et al. | |
| 6,799,112 B1 | 9/2004 | Carter et al. | |
| 2001/0047647 A1 * | 12/2001 | Cornet ................... | 60/39.08 |

OTHER PUBLICATIONS

Hydraulic and Pneumatic Symbols, p. 79.*

* cited by examiner

*Primary Examiner*—Ted Kim
(74) *Attorney, Agent, or Firm*—William Scott Andes, Esq.; Armstrong Teasdale LLP

(57) ABSTRACT

A method facilitates assembling a gas turbine engine that includes an oil supply and scavenge system, wherein the oil supply and scavenge system includes at least one sump cavity that includes a first scavenge port and a second scavenge port, a first oil pump and a second oil pump such that the first oil pump is in flow communication with and receives scavenge oil from the first scavenge port and the second oil pump is in flow communication with and receives scavenge oil from the second scavenge port. In addition, an oil supply source is coupled in flow communication with the first and second oil pumps.

20 Claims, 2 Drawing Sheets

"GET HOME" OIL SUPPLY AND SCAVENGE SYSTEM

STATEMENT REGARDING FEDERALLY SPONSORED RESEARCH & DEVELOPMENT

The government may have rights in this invention pursuant to government contract number N00019-96-C-0176.

BACKGROUND OF THE INVENTION

This invention relates generally to gas turbine engines and more particularly, to the oil supply and scavenge systems used within gas turbine engines.

A gas turbine engine typically includes at least one bearing assembly that rotatably supports a shaft. The bearing assembly is lubricated with oil, and heat from other engine components is absorbed and dissipated by the oil. Accordingly, bearing assemblies are housed within sumps that typically include an oil supply jet that supplies lubricating oil under pressure from an external pump to the bearing assemblies, and an external scavenge pump that removes lubricating oil from the sump. In at least some know engines, the scavenge pump channels the return oil through a heat exchanger prior to returning the oil to a tank or reservoir.

Within at least some applications, such as aircraft propulsion systems, interruption of the oil supply from the usual main oil pump of the engine may cause seizure of the bearing assembly, loss of engine thrust, engine fire and/or damage to the aircraft. Known methods for supplying oil to, and scavenging oil from, the various bearing sumps and gearboxes utilize a multi-element positive displacement pump. Known pumps usually are spline driven by the engine gearbox and include a supply element and a plurality of scavenge elements coupled to single or dual shafts internal to the pump. Internal failures in the pump, or the loss of drive power to the gearbox may result in the loss of supply flow of oil lubricants to the bearing, and/or loss of scavenge flow, which over time, can result in sump flooding and possible fire.

BRIEF SUMMARY OF THE INVENTION

In one aspect, a method of assembling a gas turbine engine is provided. This method comprises providing an oil supply and scavenge system that includes at least one sump cavity that includes a first scavenge port and a second scavenge port, and providing a first oil pump and a second oil pump such that the first oil pump is in flow communication with and receives scavenge oil from the first scavenge port and the second oil pump is in flow communication with and receives scavenge oil from the second scavenge port. This method also comprises providing an oil supply that is in flow communication with the first and second oil pumps.

In another aspect, an oil supply and scavenge system for a gas turbine engine is provided. The oil supply and scavenge system includes at least one sump cavity, an oil supply, a first scavenge port and a second scavenge port each coupled in flow communication with at the sump cavity. The first oil pump is coupled in flow communication with the first scavenge port for receiving scavenge oil therefrom and the first oil pump is in flow communication with the oil supply. The second oil pump is coupled in flow communication with the second scavenge port for receiving scavenge oil therefrom and the second oil pump is in flow communication with the oil supply.

In a further aspect, a gas turbine engine is provided. The engine includes a gearbox coupled to the engine and an oil supply and scavenge system. The oil supply and scavenge system includes at least one sump cavity and an oil supply. The oil supply and scavenge system also includes a first scavenge port and a second scavenge port each coupled in flow communication with the sump cavity, where the first oil pump is coupled in flow communication with the first scavenge port for receiving scavenge oil therefrom and in flow communication with the oil supply, and the second oil pump is coupled in flow communication with the second scavenge port for receiving scavenge oil therefrom and in flow communication with the oil supply.

DETAILED DESCRIPTION OF THE INVENTION

Figure 1:
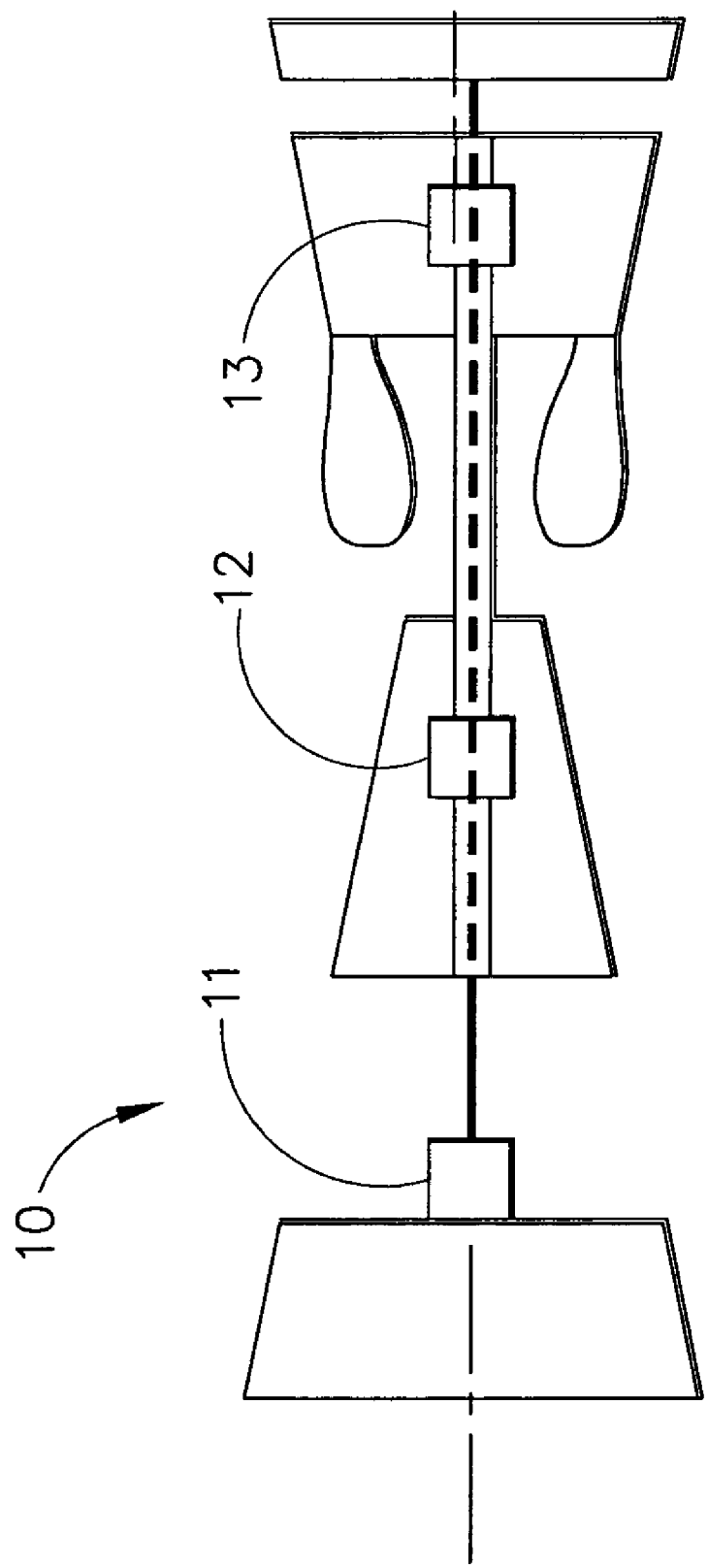
FIG. 1 is schematic illustration of an exemplary gas turbine engine.

FIG. 1 is a schematic illustration of a gas turbine engine 10, such as the F118 engine available from General Electric Company, Cincinnati, Ohio. Engine 10 includes a forward bearing 11, mid-bearing 12 and aft-bearing 13, and such bearings rotatably support the main engine shafts of engine 10.

In operation, forward bearing 11, mid-bearing 12 and aft-bearing 13 support main engine shafts (not shown) of engine 10. During engine operation, such main engine shafts rotate at very high speeds. Lubricating oil is supplied to forward bearing 11, mid-bearing 12 and aft-bearing 13 to provide lubrication and to extract heat from the bearings.

Figure 2:
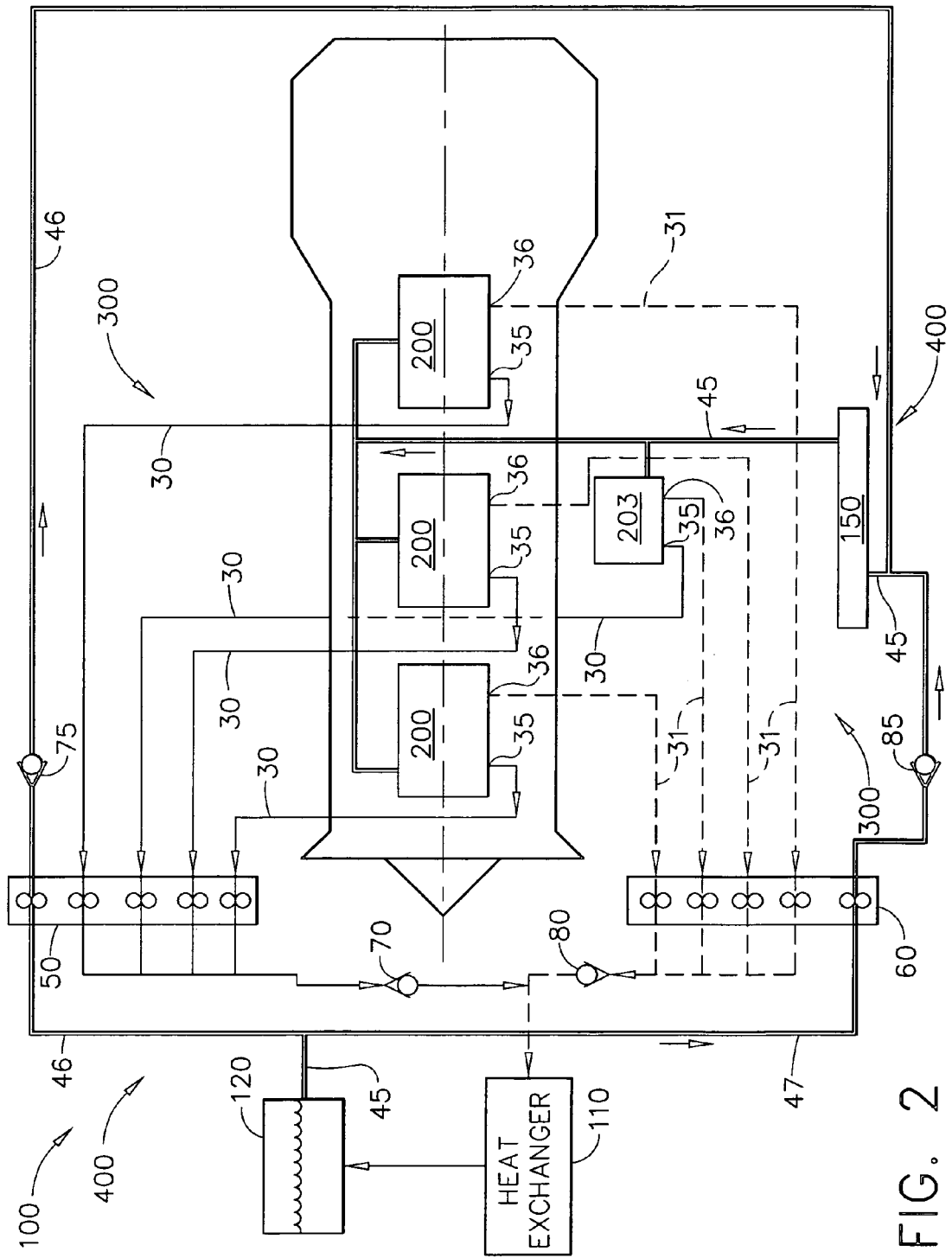
FIG. 2 is a schematic illustration of an oil supply and scavenge system for a gas turbine engine.

FIG. 2 is a schematic illustration of an oil supply and scavenge system 100 that may be used with a gas turbine engine, such as gas turbine engine 10 (shown in FIG. 1). System 100 provides an oil supply to the turbine engine main bearings (not shown) and engine gearbox 203, and also removes scavenge oil from the turbine engine main bearings and engine gearbox. A first oil pump 50 and a second oil pump 60 each coupled in flow communication to system 100.

System 100 includes a plurality of oil supply components 400 which are dedicated to supply lubricant to the turbine engine bearings (not shown) and engine gearbox 203. More specifically, in the exemplary embodiment, oil supply components 400 include an oil supply source 120, an oil supply circuit 45, first oil pump 50, second oil pump 60 and an oil filter 150. Oil supply circuit 45 channels lubricant from oil supply 120 into either first oil pump 50 or second oil pump 60 through a respective first supply pump branch 46 and/or a second supply pump branch 47. Supply circuit 45 is also coupled to oil filter 150 such that engine oil discharged from either first oil pump 50 or second oil pump 60 is channeled through oil filter 150. After passing through oil filter 150, oil is then routed into turbine engine bearing sumps 200 and engine gearbox 203.

System 100 also includes a plurality of scavenge oil components 300 which are dedicated to withdrawing scavenge oil from the turbine engine bearings and engine gearbox 203. More specifically, in the exemplary embodiment, scavenge oil components 300 include a plurality of first scavenge oil circuits 30, a plurality of second scavenge oil circuits 31, first oil pump 50, second oil pump 60 and a heat exchanger 110. In the exemplary embodiment, sumps 200 and gearbox 203 are each coupled in flow communication with first scavenge oil circuit 30 and second scavenge oil circuit 31. More specifically, in the exemplary embodiment, scavenge oil is pumped through scavenge oil circuit 30 by first oil pump 50, and scavenge oil is pumped through scavenge oil circuit 31 by second oil pump 60. Scavenge oil discharged from oil pumps 50 and 60 is channeled through heat exchanger 110 prior to being returned to oil supply 120.

System 100 also includes a plurality of flow activated check valves 70, 75, 80, 85. More specifically, in the exemplary embodiment, oil supply components 400 include check valve 75 and check valve 85, and scavenge oil components 300 include check valve 70 and check valve 80. More specifically, check valve 75 is located in supply circuit branch 46 adjacent to and downstream of first oil pump 50, check valve 85 is located in supply circuit branch 47 adjacent to and downstream of second oil pump 60, check valve 70 is located in scavenge circuit branch 30 adjacent to and downstream of first oil pump 50, and check valve 80 is located in scavenge circuits 31 adjacent to and downstream of second pump 60. In the exemplary embodiment, a pressure measuring instrument (not shown) is located in supply circuit 45 downstream of oil filter 150 and is configured to provide an alert if there is a failure of first oil pump 50 and/or second oil pump 60.

During normal engine operation, oil is supplied from oil supply source 120 via pumps 50 and 60 to engine bearing sumps 200 and to engine gearbox 203. More specifically, in the exemplary embodiment, engine oil discharged from pumps 50 and 60 is channeled through oil filter 150 and into engine bearing sumps 200 and engine gearbox 203. Oil filter 150 facilitates removing impurities from the supply oil prior to supplying the supply oil to the engine bearings. Scavenge oil is collected from bearing sumps 200 and engine gearbox 203 through a first scavenge port 35 and second scavenge port 36 that are each coupled in flow communication within sumps 200 and gearbox 203. First oil pump 50 and second oil pump 60 withdraw scavenge oil and channel the scavenge oil through heat exchanger 110. Heat exchanger 110 facilitates removing heat from scavenge oil prior to returning the oil to oil supply 120.

In the exemplary embodiment, first oil pump 50, second oil pump 60 and related oil supply circuits 45, 46 and 47 and scavenge circuits 30 and 31 are each sized such that first oil pump 50 and second oil pump 60 are each individually capable of pumping and circulating one half of the total design engine oil supply required by system 100 for operation. First oil pump 50 and second oil pump 60 are each coupled to the engine gearbox 203 and drive system (not shown) in separate locations (not shown) such that drive power to each pump 50 and pump 60 is derived from a separate location on the engine gearbox 203. Accordingly, providing drive power to first pumps 50 and 60 from separate locations on the engine gearbox 203 facilitates reducing the risk that a loss of drive power in a single area of gearbox 203 will result in loss of drive power to both first oil pump 50 and second oil pump 60. Moreover, by utilizing two oil pumps, namely, first oil pump 50 and second oil pump 60, system 100 also facilitates reducing the risk that failure of either pump 50 or pump 60 will result in an engine failure due to failure of system 100 to supply and scavenge sufficient volumes of oil to the engine.

Also in the exemplary embodiment, the primary purpose of scavenge circuit check valves 70 and 80 is to prevent scavenge oil from reversing flow direction in the event of a failure of first oil pump 50 or second oil pump 60. Similarly, the primary purpose of supply check valves 75 and 85 is to prevent supply oil from reversing flow direction in the event of a failure of first oil pump 50 or second oil pump 60.

The above described oil supply and scavenge system is cost-effective and highly reliable. The oil supply and scavenge system includes two oil pumps of equal capacity with each of the pumps in flow communication with oil supply circuits and oil scavenge circuits. Each sump included in the oil supply and scavenge system includes two scavenge ports, each of which are in flow communication with one of the two oil pumps. The oil supply and scavenge system can provide sufficient oil supply to, and scavenge oil from, the aircraft engine to support flight sustaining power levels in the event one of the two oil pumps fails.

Exemplary embodiments of an oil supply and scavenge system are described above in detail. The systems are not limited to the specific embodiments described herein, but rather, components of the system may be utilized independently and separately from other components described herein.

While the invention has been described in terms of various specific embodiments, those skilled in the art will recognize that the invention can be practiced with modification within the spirit and scope of the claims.

What is claimed is:

1. A method of assembling a gas turbine engine, said method comprising the steps of:
    providing an oil supply and scavenge system including at least one sump cavity that includes a first scavenge port and a second scavenge port;
    providing a first oil pump that includes a first oil supply element and a first scavenging element and a second oil pump that includes a second oil supply element and a second scavenging element;
    coupling the first oil pump and the second oil pump in flow communication with the oil supply and scavenge system, such that the first oil pump is in flow communication with, and receives scavenge oil from, the first scavenge port via the first scavenging element and such that the second oil pump is in flow communication with, and receives scavenge oil from, the second scavenge port via the second scavenging element;
    coupling the first oil supply element in flow communication to an oil supply source for receiving oil therefrom;
    coupling the second oil supply element in flow communication to the oil supply source for receiving oil therefrom; and
    coupling an output of the second oil supply element to the output of the first oil supply element to provide a combined output flow.

2. A method in accordance with claim 1 wherein the gas turbine engine includes a gearbox, said method further comprises: drivingly coupling the first oil pump to the gearbox at a first gearbox location; and
    drivingly coupling the second oil pump to the gearbox at a second gearbox location that is different than the first gearbox location.

3. A method in accordance with claim 1 wherein said method further comprises coupling the first and second oil pumps in flow communication with a heat exchanger and an oil filter.

4. A method in accordance with claim 1 wherein coupling a first oil pump and a second oil pump in flow communication with the oil supply and scavenge system further comprises coupling the first and second oil pumps to the oil supply and scavenge system such that each pump can individually circulate a sufficient volume of oil through the system to sustain operation of the gas turbine engine during operation.

5. A method in accordance with claim 1 further comprising coupling a plurality of sump cavities in flow communication to the oil supply and scavenge system.

6. A method in accordance with claim 1 further comprising:
 coupling at least one check valve in flow communication with the first oil pump;
 coupling at least one check valve in flow communication with the second oil pump, such that each respective check valve prevents back flow through a respective oil pump during operation of the engine.

7. A method in accordance with claim 6 wherein the method further comprises providing an alert in the event of the failure of one or more of the said first and the second oil pump.

8. An oil supply and scavenge system for a gas turbine engine, said oil supply and scavenge system comprising:
 at least one sump cavity;
 an oil supply source;
 a first scavenge port and a second scavenge port each coupled in flow communication with said at least one sump cavity;
 a first oil pump comprising a first oil supply element and a first scavenging element, wherein said first scavenging element is coupled in flow communication with said first scavenge port for receiving scavenge oil therefrom, and wherein said first oil supply element is coupled in flow communication with said oil supply source for receiving oil therefrom; and
 a second oil pump comprising a second oil supply element and a second scavenging element, wherein said second scavenging element is coupled in flow communication with said second scavenge port for receiving scavenge oil therefrom, and wherein said second oil supply element is coupled in flow communication with said oil supply source for receiving oil therefrom, the first oil supply element having an output fluidly coupled to an output of the second oil supply element to provide a combined output flow.

9. An oil supply and scavenge system in accordance with claim 8 wherein said first and second oil pumps are each operatively coupled to an engine gearbox.

10. An oil supply and scavenge system in accordance with claim 9 wherein said first oil pump is drivingly coupled to the engine gearbox at a first gearbox location, said second oil pump is drivingly coupled to the gearbox at a second gearbox location that is different than the first gearbox location, such that each of said first and second oil pumps is individually capable of continued engine operation during a period of loss of power to said remaining oil pump.

11. An oil supply and scavenge system in accordance with claim 8 wherein said first and second oil pumps are each coupled in flow communication with a heat exchanger.

12. An oil supply and scavenge system in accordance with claim 8 wherein said first and second oil pumps are each coupled in flow communication with an oil filter.

13. An oil supply and scavenge system in accordance with claim 8 wherein each of said first and second oil pumps can individually sustain operation of said gas turbine engine at flight sustaining power levels.

14. An oil supply and scavenge system in accordance with claim 8 further comprising a plurality of sump cavities coupled in flow communication to the oil supply and scavenge system.

15. An oil supply and scavenge system in accordance with claim 8 wherein at least one check valve is in flow communication with said first oil pump and at least one check valve is in flow communication with said second oil pump, said check valves configured to prevent back flow through said first and second oil pumps, respectively.

16. An oil supply and scavenge system in accordance with claim 8 wherein said oil supply and scavenge system is configured to indicate an alert in the event of a failure of one or more of said first and second oil pump.

17. A gas turbine engine comprising;
 a gearbox coupled to said gas turbine engine;
 an oil supply and scavenge system, said oil supply and scavenge system comprising at least one sump cavity and an oil supply source;
 said oil supply and scavenge system further comprising a first scavenge port and a second scavenge port each coupled in flow communication with said at least one sump cavity;
 a first oil pump comprising a first oil supply element and a first scavenging element, wherein said first scavenging element is coupled in flow communication with said first scavenge port for receiving scavenge oil therefrom and wherein said first oil supply element is coupled in flow communication with said oil supply for receiving oil therefrom; and
 a second oil pump comprising a second oil supply element and a second scavenging element, wherein said second scavenging element is coupled in flow communication with said second scavenge port for receiving scavenge oil therefrom and wherein said second oil supply element is coupled in flow communication with said oil supply for receiving oil therefrom, the first oil supply element having an output fluidly coupled to an output of the second oil supply element to provide a combined output flow.

18. A gas turbine engine in accordance with claim 17 wherein said first oil pump is drivingly coupled to the engine gearbox at a first gearbox location and said second oil pump is drivingly coupled to the engine gearbox at a second gearbox location that is different than the first gearbox location, each of said first and second oil pumps is capable of supplying a predetermined flow of oil to support continued engine operation during a period of loss of power to the remaining oil pump.

19. A gas turbine engine in accordance with claim 17 wherein each of said first and second oil pumps can individually sustain operation of said engine at flight sustaining power levels.

20. A gas turbine engine in accordance with claim 17 further comprising:
 at least one check valve in flow communication with said first oil pump, at least one cheek valve in flow communication with said second oil pump, such that each respective check valve prevents back flow through a respective oil pump during engine operation; and
 said an oil supply and scavenge system is configured to initiate an alert in the event of the failure of one or more of said first and second oil pumps.

* * * * *